United States Patent [19]

Nishiuchi et al.

[11] Patent Number: 4,689,211

[45] Date of Patent: Aug. 25, 1987

[54] METHOD OF PREPARING FIBROUS ALKALI METAL TITANATE

[75] Inventors: Kihachiro Nishiuchi; Masayoshi Suzue, both of Tokushima; Koji Sakane, Ashiya, all of Japan

[73] Assignee: Otsuka Kagakii Kabushiki Kaisha, Osaka, Japan

[21] Appl. No.: 718,346

[22] Filed: Apr. 1, 1985

[30] Foreign Application Priority Data

Mar. 30, 1984 [JP] Japan .................................. 59-64982
Mar. 30, 1984 [JP] Japan .................................. 59-64983

[51] Int. Cl.$^4$ ............................................ C01G 23/00
[52] U.S. Cl. .................................................... 423/598
[58] Field of Search ......................................... 423/598

[56] References Cited

U.S. PATENT DOCUMENTS 3,328,117 6/1967 Emslie et al. ............................ 23/51
4,179,496 12/1979 Yamagida et al. ................... 423/598

FOREIGN PATENT DOCUMENTS 139826 12/1978 Japan .................................. 423/598

Primary Examiner—H. T. Carter
Attorney, Agent, or Firm—Murray, Whisenhunt and Ferguson

[57] ABSTRACT

A method of preparing a fibrous alkali metal titanate which comprises drying a slurry of a titanium-containing compound and an oxygen-containing alkali metal compound, baking the dried mixture and pulverizing the resulting agglomerate.

6 Claims, No Drawings

METHOD OF PREPARING FIBROUS ALKALI METAL TITANATE

This invention relates to a method of preparing a fibrous alkali metal titanate, more particularly to a method of preparing a fibrous alkali metal titanate from a titanium-containing compound and an oxygen-containing alkali metal compound.

Fibrous alkali metal titanates are useful as a plastic reinforcing material, abrasive material, filter material, diaphragm of a battery, pigment, insulating material, etc.

Many processes are already proposed to prepare a fibrous alkali metal titanate. They are, for example, a baking method, melting method, hydrothermal method, flux method and improved melting method. Generally, titanium oxide and a basic oxygen-containing alkali metal compound are used as starting materials in any of processes.

Recently, a fibrous alkali metal titanate is expected as a substitute for asbestos. However, the presently available fibrous alkali metal titanate is small in aspect ratio (fiber length/fiber diameter) compared with asbestos and cannot be used practically. Japanese Examined Patent Publication No. 27,264/1967 discloses, as a titanium source, hydrous titania, anatase, a product containing $TiO_2$ obtained in sulfate method for preparing a pigment, electronic material or catalyst, purified anatase pigment, pulverized rutile ore and commercially available ilmenite. Alkali metal hydroxide, alkali metal carbonate, etc are disclosed as a basic oxygen-containing alkali metal compound. The above Japanese Publication No. 27,264/1967 is concerned with apreparation of a fibrous alkali metal titanate by baking a non-liquid mixture of the above titanium source and the basic oxygen-containing alkali metal compound at a temperature of 200° to 1150° C. The above mixture is baked at a temperature of 200° to 850° C., in case of preparing alkali metal titanate containing predominantly colloid-type compound having a diameter of 0.005 to 0.1 $\mu$m and a length of at least ten times its diameter. When alkali metal titanate containing chiefly pigment-type compound having a diameter of 0.1 to 0.8 $\mu$m and a length of 10 to 100 times its diameter is to be prepared, the mixture is baked at a temperature of 850° to 975° C. In case that the mixture is baked at a temperature of 975° to 1150° C., alkali metal titanate is obtained which contains predominantly insulation-type compound having a diameter of 0.6 to 3.0 $\mu$m and a length of 100 to 1000 times its diameter. Further, it is disclosed to add an alkali metal halide to the starting non-liquid mixture prior to baking.

The obtained fibrous alkali metal titanate in the above processes is difficult to separate from the fibrous agglomerate resulting from the baking and has a length of 10 to 20 $\mu$m and an aspect ratio of about 50 due to the breakage of fibers in the pulverization process. Thus, the obtained fibrous titanate has an insufficient property and a limited use.

An object of the invention is to provide a method of preparing a fibrous alkali metal titanate which is easily separated from a firbrous agglomerate resulting from the baking and difficult to be broken in the pulverization process.

Another object of the invention is to provide a process for preparing a fibrous alkali metal titanate which is great in aspect ratio and high in strength.

The above and other objects of the invention will be apparent from the following description.

The present invention provides a method of preparing a fibrous alkali metal titanate which comprises drying a slurry of a titanium-containing compound and an oxygen-containing alkali metal compound, baking the dried mixture and pulverizing the resulting agglomerate.

In the invention, the titanium-containing compounds are those which substantially contain $TiO_2$ in the form of a slurry or non-slurry. Examples of useful titanium-containing compounds are titanium oxide, rutile ore, titanium hydroxide slurry (wet cake), hydrous titania, etc. These compounds are preferably in the form of fine particles. Preferred example of titanium oxide is an anatase fine particle. Preferable example of rutile ore is a fine particle obtained by subjecting particles to collision at a high velocity, which is so-called "jet-pulverized particle". These titanium-containing compounds have particle size of preferably 200 to 425 mesh.

Preferable example of titanium hydroxide slurry (wet cake) is one obtained as an intermediate in the process of preparing titanium oxide industrially by the sulfuric acid method. This slurry is obtained by heating titanium ore or titanium slag in sulfuric acid, extracting and purifying the resulting titanyl sulfate, hydrolysing the titanyl sulfate with heating and, when required, bleaching and washing the hydrolysate.

The slurry has approximately the following composition.

$Ti O(OH)_2$ 40.4 to 49.0% by weight (33 to 40% by weight celculated as $TiO_2$);

$H_2SO_4$ 2.0 to 3.2% by weight (6.1 to 9.8% by weight based on $TiO_2$);

$H_2O$ 47.8 to 57.6% by weight.

The slurry is preferably adjusted to contain 10 to 35% by weight of $TiO_2$ with addition of water but is not limited thereto.

The oxygen-containing alkali metal compound used in the invention are those producing $M_2O$ (M being alkali metal) upon baking. The compound may be in the form of a slurry or non-slurry. The compounds include oxides, hydroxides, carbonates, bicarbonates, oxalates and nitrates of potassium, sodium, cesium and rubidium, etc. Examples thereof are $K_2O$, $KOH$, $K_2CO_2$, $KHCO_2$, $K_2C_2O_4$, $KNO_3$, $Na_2O$, $NaOH$, $Na_2CO_2$, $NaHCO_2$, $Na_2C_2O_4$, $NaNO_2$, $Cs_2O$, $CsOH$, $Cs_2CO_3$, $CsHCO_3$, $Cs_2C_2O_4$, $CsNO_2$, $Rb_2O$, $RbOH$, $Rb_2CO_3$, $RbHCO_2$, $Rb_2C_2O_4$, $RbNO_2$, etc.

According to the invention, the titanium-containing compound and the oxygen-containing alkali metal compound are made into a slurry and the slurry is dried to obtain particles. It is possible to admix the starting materials both in the form of a slurry, to add to water the starting materials both in the form of a non-slurry or to add a non-slurry material to a slurry material. Further, when required, water may be added to the resulting slurry. The slurry is dried by heating but is preferably spray-dried.

When spray-dried, particles are obtained in which the oxygen-containing alkali metal compound adheres homogeneously and finely to particle surface of the titanium-containing compound. When this particle is baked, the oxygen-containing alkali metal compound diffuses and penetrates into $TiO_2$ at a high reaction velocity to produce a fibrous alkali metal titanate having a high aspect ratio. The slurry contains the titanium-containing compound of preferably 10 to 45% by weight in terms of $TiO_2$. The slurry is dried preferably at a temperature of about 50° to 250° C. Particle size of the dried particle depends on a drying temperature, slurry concentration, and when spray-drying, further on feed rate, disc-shape and disc-revolution of a spray nozzle, but is preferably about 50 to 500 μm.

The proportions of the titanium-containing compound and the oxygen-containing alkali metal compound are preferably 3 to 3.5 in terms of molar ratio of $TiO_2/M_2O$, but are not limited thereto. It is possible to add a small amount of potassium chloride as an auxiliary additive. The dried mixture of starting materials can be baked as it is, but is preferably pressed to prepare a shaped product having an enhanced density in order to improve their reactivities. In this case, it is preferable to add a small amount of water, organic binder or surfactant to the mixture to give an excellent shapability. The mixture is shaped at a suitable pressure which is usually 20 to 300 kg/cm2, preferably 50 to 150 kg/cm².

The dried mixture can be baked at a wide range of temperatures but is baked at a temperature of preferably 900° to 1300° C., more preferably 1000° to 1200° C., The baking time is selected preferably from about 15 minutes to 6 hours, more preferably from about 30 minutes to 3 hours. Further, it is preferable to gradually cool the alkali metal titanate resulting from the baking in order to grow the fiber length sufficiently.

The gradual cooling is conducted by lowering the temperature in a wide range but is usually conducted at a temperature of 900° to 950° C. Further, fibers having higher aspect ratio can be obtained by further baking after gradual cooling or by repeating the processes at least twice which comprise the baking and gradual cooling.

By the above reaction can be obtained an agglomerate which is predominantly fibrous. In the invention, the agglomerate is pulverized to prepare a fibrous alkali metal titanate having a high aspect ratio.

The obtained fibrous material is added to water and pulverized by DISPER stirrer or the like. The fibrous material is placed in water preferably for at least one hour to become intimate with water. For pulverization, various known machines are usable. The fibrous material is pulverized preferably by subjecting the material to collision each other at a high velocity (hereinafter this is referred to as "jet-pulverizing method"). The dispersion composed predominantly of pulverized fibers is filtered and the filtrates are dried to produce the desired fibrous alkali metal titanate.

In the invention, when the starting slurry is spray-dried, the oxygen-containing alkali metal compound reacts with $TiO_2$ homogeneously at a high reaction velocity by baking, and the resulting alkali metal titanate agglomerate can be very easily pulverized to prepare the desired product having a high aspect ratio.

The fibrous alkali metal titanate of the invention is a compound represented by the formula

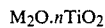

$M_2O.nTiO_2$ wherein M is alkali metal, n is a real number of 2 to 8, or a mixture of these compounds. The above titanate has a fiber diameter of preferably 0.1 to 1 μm and a fiber length of preferably 50 to 300 μm.

The invention will be described below with reference to Examples and Comparison Examples in which % is by weight unless otherwise specified.

EXAMPLE 1

To a vessel equipped with a high-speed stirrer was placed a titanium hydroxide slurry ($TiO_2$ 29,9%, $H_2SO_4$ 4.17%). Thereto was added potassium hydroxide such that $TiO_2/K_2O$ molar ratio was 3.3 for neutralizing $H_2SO_4$ in the slurry and for reaction and the mixture was thoroughly admixed. The resulting slurry was placed into an oven over night. The dried mixture was finely pulverized. The mixture was shaped by a mold 60 mm in diameter at a pressure of 200 kg/cm². The shaped mixture was placed into a muffle farnace and heated at 1100° C. for 7 hours. The baked product was roughly pulverized and immersed in water over night. Water was removed by filtration and the filtrate was washed and dried to obtain a fibrous potassium titanate. Table 1 shows yield and fiber properties of the fibrous potassium titanate.

EXAMPLE 2

The shaped mixture obtained in the same manner as in Example 1 was placed into a muffle furnace and heated at 1100° C. for 4 hours. Then, the mixture was gradually cooled to 950° C. at a rate of 20° C./hr to complete the reaction. The baked product was pulverized in the same manner as in Example 1 to obtain a fibrous potassium titanate. Table 1 gives yield and fiber properties of the potassium titanate.

EXAMPLE 3

A fibrous potassium titanate was prepared in the same manner as in Example 1 except that potassium carbonate (first class grade chemical) was used in place of potassium hydroxide. Table 1 exhibits yield and fiber properties of the fibrous potassium titanate.

EXAMPLE 4

To the same titanium hydroxide slurry as in Example 1 was added potassium carbonate (first class grade chemical) such that $TiO_2/K_2O$ molar ratio was 3.5 for neutralization and reaction. A fibrous potassium titanate was prepared in the same manner as in Example 1 with the exception of using the above mixture. Table 1 shows yield and fiber properties of the fibrous potassium titanate.

COMPARISON EXAMPLE 1

To the same titanium hydroxide slurry as in Example 1 was added an aqueous ammonia solution in such amount as to achieve neutralization and then added potassium carbonate such that $TiO_2/K_2O$ molar ratio was 3.3 for reaction. A fibrous potassium titanate was prepared in the same manner as in Example 1 with the exception of using the above mixture. Table 1 shows yield and fiber properties of the fibrous potassium titanate.

COMPARISON EXAMPLE 2

Titanium hydroxide slurry neutralized in the same manner as in Comparison Example 1 was filtered, washed and dried in an oven to obtain a hydrous titania. Thereto was added potassium carbonate (first class grade chemical) such that $TiO_2/K_2O$ molar ratio was 3.3. The mixture was thoroughly admixed by a mixer and was shaped by a mold 60 mm in a diameter at a pressure of 200 kg/cm². The shaped mixture was placed into a muffle farnace and heated at 1100° C. for 7 hours. The baked product was roughly pulverized and immersed in water over night. Water was removed by filtration and the filtrate was washed and dried to obtain a fibrous potassium titanate. Table 1 shows yield and fiber properties of the fibrous potassium titanate.

COMPARISON EXAMPLE 3

To commercially available anatase (a product of Teikoku Kako Co., Ltd.) was added potassium sulfate (first class grade chemical) in an amount of 25% based on $TiO_2$. Thereto was added potassium carbonate (first class grade chemical) such that $TiO_2/K_2O$ molar ratio was 3.3 for reaction. A fibrous potassium titanate was prepared in the same manner as in Example 1 with the exception of using the above mixture. Table 1 shows yield and fiber properties of the fibrous potassium titanate.

TABLE 1

|  | Example | | | | Com. Example | | |
|---|---|---|---|---|---|---|---|
|  | 1 | 2 | 3 | 4 | 1 | 2 | 3 |
| Yield | 97 | 99 | 98 | 98 | 97 | 96 | 96 |
| Average fiber diameter (μm) | 0.4 | 0.5 | 0.4 | 0.4 | 0.3 | 0.3 | 0.4 |
| Average fiber length (μm) | 120 | 150 | 105 | 95 | 30 | 20 | 30 |
| Aspect ratio | 300 | 300 | 263 | 238 | 100 | 67 | 50 |
| Component (Note 1) | B ≧ A | A > B | B ≧ A | B ≧ A | B ≧ A | B > A | B > A |

(Note 1)
A: potassium tetratitanate
B: potassium hexatitanate

EXAMPLE 5

To water were added pulverized rutile sand and potassium carbonate such that $TiO_2/K_2O$ molar ratio was 3. The rutile sand passed through #350 sieve and elementary analysis thereof was 97.5% in $TiO_2$, 0.2% $SiO_2$, 0.25% $Al_2O_2$, 0.15% $Fe_2O_2$, 0.5% $ZrO_2$. The resulting slurry was dried by a spray-drier (OC-16 type, a product of Ogawara Kakoki Co., Ltd.) to obtain dried granules having excellent flowability. The granule was shaped by a mold 60 mm in diameter at a pressure of 200 kg/cm². The shaped product was placed into an electric furnace and heated at 1100° C. for 7 hours. The baked product was roughly pulverized and immersed in water over night. Water was removed by filtration and the filtrate was dried. The dried product was pulverized by a jet-pulverizing machine [P J M-100 type, a product of Nihon Neumatic Industry Co., Ltd.] to obtain a fibrous potassium titanate. Table 2 gives yield and fiber properties of the fibrous potassium titanate.

EXAMPLE 6

To a vessel equipped with a high-speed stirrer was placed a titanium hydroxide slurry ($TiO_2$ 29.9%, $H_2SO_4$ 4.17%). Thereto was added potassium hydroxide such that $TiO_2/K_2O$ molar ratio was 3 for neutralizing $H_2SO_4$ in the slurry and for reaction and the mixture was thoroughly admixed. The resulting slurry was spray-dried in the same manner as in Example 5 to obtain dried granules. The granule was shaped by a mold 60 mm in a diameter at a pressure of 100 kg/cm². The shaped product was heated at 1100° C. for 4 hours and then gradually cooled to 950° C. at a rate of 20° C./hr to complete the reaction. The product was roughly pulverized, immersed in water and then placed into a hot water. The product was pulverized by DISPER stirrer and the fibrous materials are filtered and the filtrate was washed and dried to obtain a fibrous potassium titanate. The results were shown in Table 2.

EXAMPLE 7

To water were added commercially available titanium oxide (anatase) and potassium carbonate such that $TiO_2/K_2O$ molar ratio was 3. The resulting slurry was spray-dried in the same manner as in Example 5 to obtain dried granules. The granule was shaped at a pressure of 100 kg/cm² to prepare a shaped product 60 mm in diameter and 30 mm in height. The shaped product was placed in a muffle furnace and was heated at 1100° C. for 7 hours. A fibrous potassium titanate was prepared in the same manner as in Example 6 with the exception of using the above baked product. The results were given in Table 2.

TABLE 2

|  | Example | | |
|---|---|---|---|
|  | 5 | 6 | 7 |
| Yield (%) | 98 | 100 | 99 |
| Average fiber diameter (μm) | 0.4 | 0.7 | 0.6 |
| Average fiber length (μm) | 100 | 200 | 150 |
| Aspect ratio | 250 | 286 | 250 |
| Component (Note 1) | B > A | A > B | B ≧ A |

We claim:

1. A method of preparing a fibrous alkali metal titanate selected from the group consisting of compounds represented by the formula $$M_2O \cdot nTiO_2$$

wherein M is alkali metal and n is a real number of 2 to 8 and mixtures thereof which comprises drying a slurry of a $TiO_2$-containing compound and an oxygen-containing alkali metal compound capable of producing $M_2O$ upon baking, wherein M is as previously defined, baking the dried mixture at a temperature of 1000° to 1300° C. gradually cooling the baked product to a temperature of 900° to 950° C. at a cooling rate of about 20° C./hr. and pulverizing the resulting agglomerate.

2. A method as defined in claim 1 wherein the titanium-containing compound is mixed with the oxygen-containing alkali metal compound in such that $TiO_2/M_2O$ (M is alkali metal) molar ratio is 3 to 3.5.

3. A method as defined in claim 1 wherein the slurry contians the titanium-containing compound of 10 to 25% by weight in terms of $TiO_2$.

4. A method as defined in claim 1 wherein the oxygen-containing alkali metal compound is at least one selected from the group consisting of oxides, hydroxides and carbonates of alkali metal.

5. A method as defined in claim 1 wherein the slurry is spray-dried.

6. A method as define in claim 1 wherein the pulverization of the agglomerate is conducted by a jet-pulverizing method.

* * * * *